(12) United States Patent
Ichikawa et al.

(10) Patent No.: US 8,254,056 B2
(45) Date of Patent: Aug. 28, 2012

(54) AIR BREATHER WITH WATERPROOF FIBER MATERIAL FOR MAGNETIC DISK DRIVE

(75) Inventors: Katsuji Ichikawa, Shizuoka (JP); Mitsuhiko Oguchi, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 803 days.

(21) Appl. No.: 11/724,823

(22) Filed: Mar. 16, 2007

(65) Prior Publication Data
US 2007/0230037 A1    Oct. 4, 2007

(30) Foreign Application Priority Data
Mar. 30, 2006 (JP) .................................. 2006-095748

(51) Int. Cl.
*G11B 33/08*  (2006.01)
*G11B 33/14*  (2006.01)
*H05K 7/20*   (2006.01)

(52) U.S. Cl. ................................................ 360/97.18

(58) Field of Classification Search ............... 360/97.02, 360/97.12, 97.13, 97.16, 97.17, 97.18
See application file for complete search history.

(56) References Cited

U.S. PATENT DOCUMENTS

| | | | |
|---|---|---|---|
| 5,030,260 A * | 7/1991 | Beck et al. | 96/139 |
| 5,537,270 A | 7/1996 | Morehouse et al. | |
| 5,764,435 A | 6/1998 | Sugimoto et al. | |
| 5,985,005 A * | 11/1999 | Mizobe | 96/7 |
| 6,214,070 B1 * | 4/2001 | Crowder et al. | 55/320 |
| 2003/0153457 A1 | 8/2003 | Nemoto et al. | |
| 2004/0013866 A1 | 1/2004 | Sasaki et al. | |
| 2004/0096744 A1 * | 5/2004 | Sadamitsu et al. | 429/254 |
| 2005/0241483 A1 | 11/2005 | Okada et al. | |

FOREIGN PATENT DOCUMENTS

| | | |
|---|---|---|
| JP | 62-073484 | 4/1987 |
| JP | 03266285 | 11/1991 |
| JP | 09-147544 A | 6/1997 |
| JP | 09147544 | 6/1997 |
| JP | 11-242872 | 9/1999 |
| JP | 2001-168543 | 6/2001 |
| JP | 2003320215 | 11/2003 |
| JP | 2003340233 | 12/2003 |
| JP | 2004055055 | 2/2004 |

OTHER PUBLICATIONS

The Partial European Search Report for EP Application No. 06027125.1-2210, dated Jul. 7, 2008, 4 pages total.
Hitachi, Ltd., "Japanese document from client", (Aug. 26, 2010),1-3.

* cited by examiner

*Primary Examiner* — Craig A. Renner
*Assistant Examiner* — Gustavo Polo (57) ABSTRACT

Embodiments in accordance with the present invention provide a magnetic disk drive that reliably prevents entry of water or other form of liquid through a breathing hole for the enhanced performance, reliability, and the like. In one embodiment, a box body forming part of a hard disk drive (HDD) has a top cover. The top cover includes a breathing hole drilled therein. The breathing hole serves to eliminate any pressure difference between an inside and an outside of the HDD. A fiber waterproof body, which includes a waterproof fiber material or the like, is fitted in a large-diameter hole of the breathing hole. A pore waterproof body, formed by bundling up a large number of slender pores, is mounted in a small-diameter hole of the breathing hole.

4 Claims, 11 Drawing Sheets

AIR BREATHER WITH WATERPROOF FIBER MATERIAL FOR MAGNETIC DISK DRIVE

CROSS-REFERENCE TO RELATED APPLICATION

The instant nonprovisional patent application claims priority to Japanese Application No. 2006-095748 filed Mar. 30, 2006 and incorporated by reference in its entirety herein for all purposes.

BACKGROUND OF THE INVENTION

A known magnetic disk drive typically includes a breathing hole drilled in an outer wall surface thereof, the hole providing communication between an outside and an inside of the drive. Atmosphere flows in and out of the drive through this breathing hole. Differential pressure between the inside and the outside of the drive produced during starting to rotate a magnetic disk or the like is thereby eliminated, so that the drive can be kept in a fully operational condition. (See, for example, Japanese Laid-Open Patent No. Sho 62-73484)

The magnetic disk drive has conventionally and commonly been used in a personal computer or the like that is fixedly installed indoors. This common application has precluded circumstances, in which water or other form of liquid enters the magnetic disk drive. Because of a new application of the magnetic disk drive arising lately in the field of CE (MP3 (MPEG Audio layer-3) players, cellular phones, mobile computers, and the like), however, there is greater likelihood that water or other form of liquid will enter the disk drive as a result of submersion under water, rainwater, and the like. The magnetic disk drive is a type of precision equipment and entry of water or other form of liquid in the magnetic disk drive is not desirable.

BRIEF SUMMARY OF THE INVENTION

Embodiments in accordance with the present invention provide a magnetic disk drive that reliably prevents entry of water or other form of liquid through a breathing hole for the enhanced performance, reliability, and the like. In accordance with the particular embodiments shown in FIGS. 2-4, a box body 10 forming part of a hard disk drive (HDD) 1 has a top cover 12. The top cover 12 includes a breathing hole 20 drilled therein. The breathing hole 20 serves to eliminate any pressure difference between an inside and an outside of the HDD 1. A fiber waterproof body 30, which includes a waterproof fiber material 32 or the like, is fitted in a large-diameter hole 21 of the breathing hole 20. A pore waterproof body 40, formed by bundling up a large number of slender pores 42A, is mounted in a small-diameter hole 22 of the breathing hole 20.

DETAILED DESCRIPTION OF THE INVENTION

Embodiments in accordance with the present invention relate to a magnetic disk drive, such as, for example, a hard disk drive.

An object of embodiments of the present invention is to provide a magnetic disk drive that reliably prevents entry of water or other form of liquid through a breathing hole for the enhanced performance, reliability, and the like.

To solve the problems described above, a magnetic disk drive is provided. The magnetic disk drive includes a box body that has a head disk assembly built therein for writing data to, and reading data from, a magnetic recording medium. The box body includes a wall surface which has a breathing hole drilled therein to penetrate therethrough. Further, the breathing hole includes a waterproof body disposed therein. The waterproof body has a plurality of pores. The waterproof body prevents entry of a liquid in the box body by using surface tension of the liquid when the liquid enters the pores.

Figure 1:
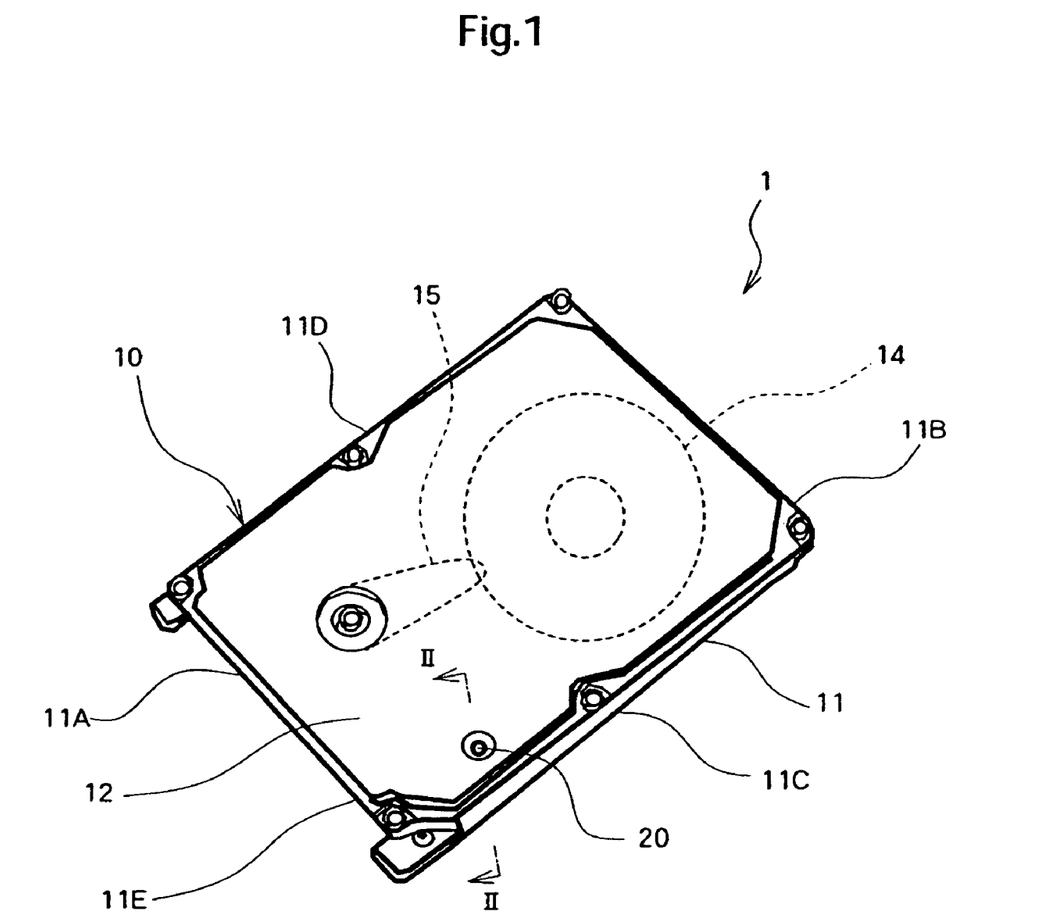
FIG. 1 is a general perspective view showing a HDD according to an embodiment of the present invention.
Figure 2:
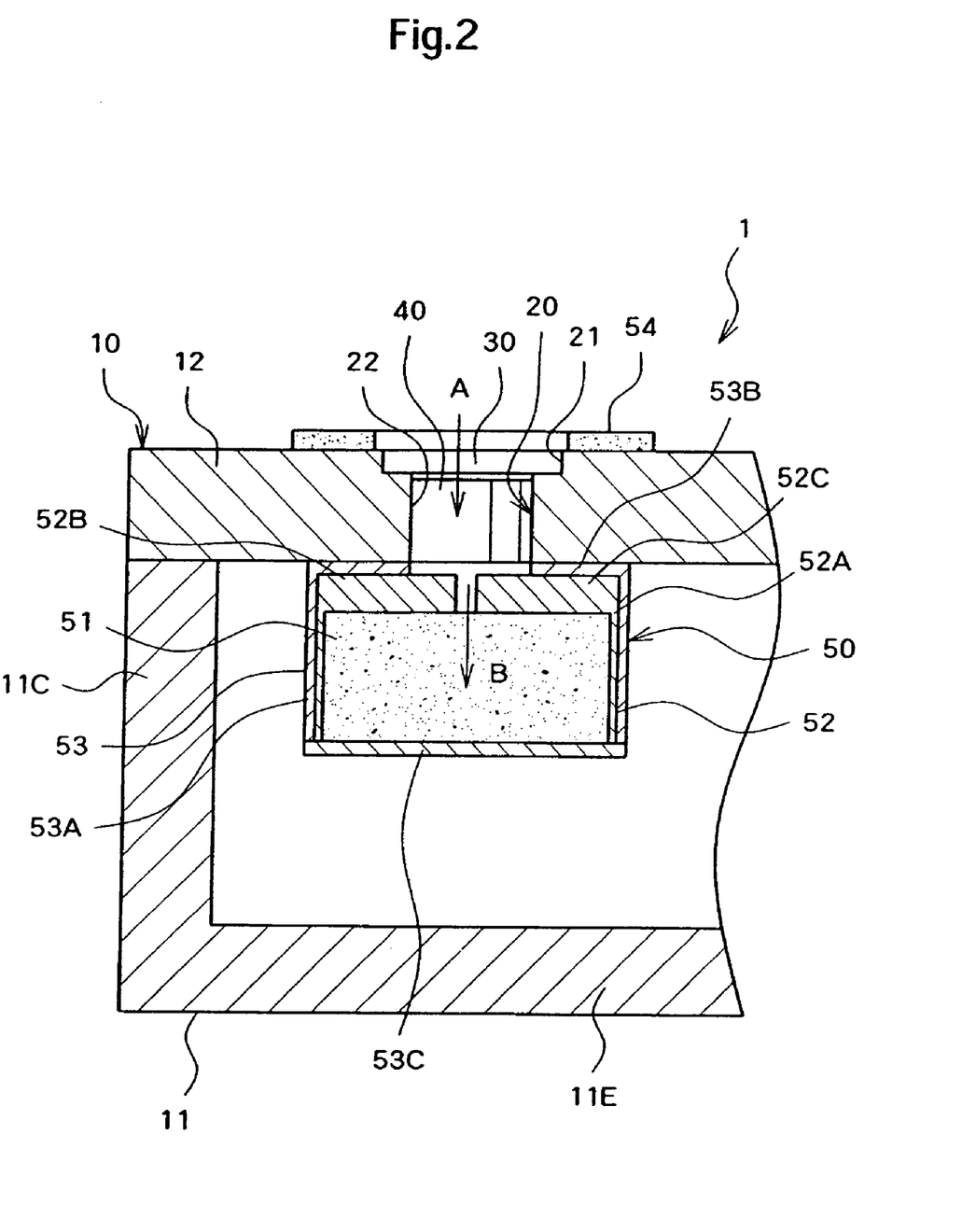
FIG. 2 is a fragmentary enlarged sectional view as viewed from a direction of an arrow II-II of FIG. 1.

A specific embodiment to which the present invention is applied will be described below with reference to FIGS. 1 and 2.

A magnetic disk drive I (hereinafter referred to as HDD 1) according to an embodiment of the present invention is, for example, a hard disk drive. Referring to FIGS. 1 and 2, the HDD 1 includes a box body 10, a fiber waterproof body 30, a pore waterproof body 40, and a built-in filter unit 50.

The box body 10 is formed from a metallic material such as a steel sheet into a rectangular parallelepiped cabinet. The box body 10 includes a box body main body 11 and a top cover 12. The box body main body 11 is a bottomed rectangular tube having one in a thickness direction of the box body 10 (a lower end side in FIG. 2) closed and another side (an upper end side in FIG. 2) opened. The top cover 12, which is a substantially rectangular flat sheet, closes the open side of the box body main body 11. The box body main body 11 includes a first side wall portion 11A, a second side wall portion 11B, a third side wall portion 1C, a fourth side wall portion 11D, and a bottom wall portion 11E integrally formed with each of the four side wall portions 11A to 11D. The top cover 12, the side wall portions 11A to 11D, and the bottom wall portion 11E correspond to "wall surfaces" in the appended claims.

The box body 10 has the following elements built therein: specifically, a plurality of magnetic recording disks 14 (only one is shown in the figure) rotatably driven by a spindle motor (not shown); a head gimbal assembly 15; magnetic heads (not shown) that write data to, and/or read data from, the magnetic recording disks 14; and the like. The spindle motor, the magnetic recording disks 14, the head gimbal assembly 15, the magnetic heads, and the like collectively called a head disk assembly.

The top cover 12 includes a breathing hole 20. The breathing hole 20 includes a circular stepped hole disposed on a side of a corner formed between the first side wall portion 11A and the third side wall portion 11C of the box body main body 11. Referring to FIG. 2, the breathing hole 20 includes a large-diameter hole 21 and a small-diameter hole 22. The large-diameter hole 21 is an upper side portion of the breathing hole 20. The small-diameter hole 22 is disposed immediately below the large-diameter hole 21, forming a lower side portion of the breathing hole 20. Air or other form of gas flows in and out of the box body 10 through the breathing hole 20. Accordingly, the breathing hole 20 is assigned with a function of eliminating any difference in pressure, temperature, and the like between an inside and an outside of the box body 10.

Figure 3:
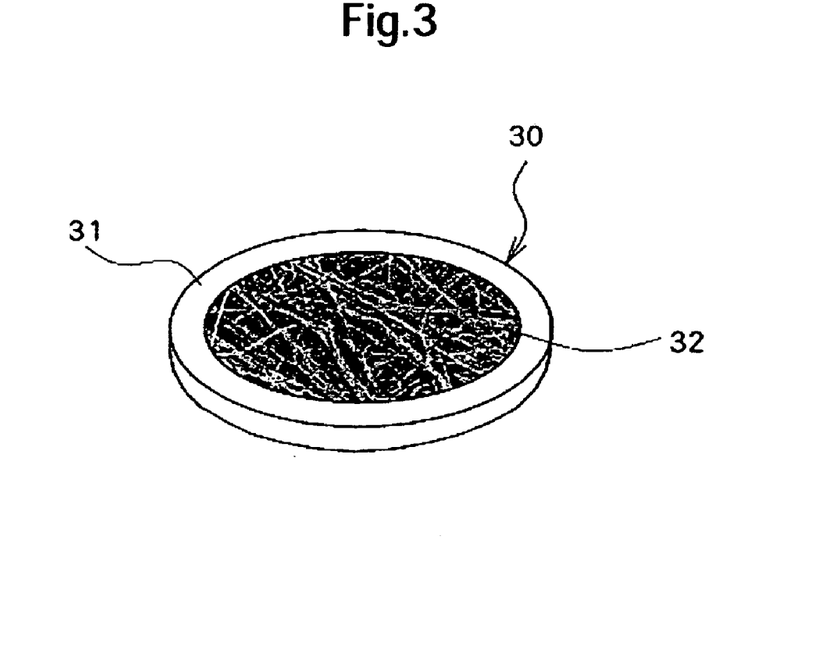
FIG. 3 is an enlarged perspective view showing a fiber waterproof body shown in FIG. 2.

Referring to FIG. 3, the fiber waterproof body 30 includes a fiber mounting frame 31 and a waterproof fiber material 32 fitted in the fiber mounting frame 31. The fiber mounting frame 31 is formed into an annular frame body from, for example, plastic. The fiber mounting frame 31 is fitted into the large-diameter hole 21 of the breathing hole 20 and secured therein using an adhesive or the like. The waterproof fiber material 32, on the other hand, is formed into a disk shape using, for example, a high water-absorption resin formed from a crosslinked body of a hydrophilic, straight-chain or branched polymer. The waterproof fiber material 32 is fixedly mounted in the fiber mounting frame 31. The high water-absorption resin is a porous body having a three-dimensional network structure. When in contact with water, the resin absorbs water with its force of being dissolved in water. The resin thereby inhibits entry of water or other form of liquid through the breathing hole 20 into the box body 10, while allowing passage of air.

Figure 4:
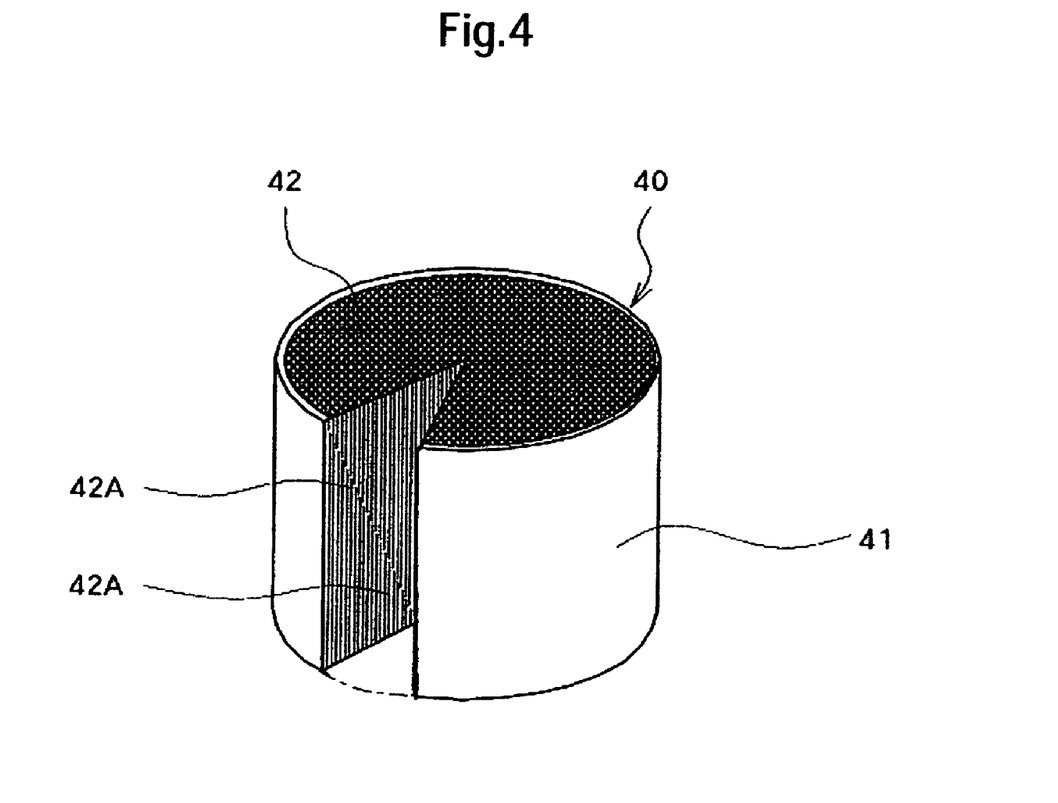
FIG. 4 is an enlarged perspective view showing a pore waterproof body shown in FIG. 2.

Referring to FIG. 4, the pore waterproof body 40 includes a pore mounting case 41 and a waterproof porous material 42 fitted in the pore mounting case 41. The pore mounting case 41 is formed into a cylinder using, for example, plastic. The pore mounting case 41 is fitted into the small-diameter hole 22 of the breathing hole 20 and secured therein using an adhesive or the like. The waterproof porous material 42 includes a plurality of pores 42A formed therein. These pores 42A extend slenderly along an axial direction of the pore mounting case 41. The waterproof porous material 42 is fixedly mounted in the pore mounting case 41. The waterproof porous material 42 of the pore waterproof body 40 blocks off, with the fiber waterproof body 30, liquid that would otherwise enter the box body 10 by using surface tension of the liquid as the liquid enters each of the pores 42A.

The built-in filter unit 50 includes a filter 51, an inner unit case 52, and an outer unit case 53. The built-in filter unit 50 is disposed on an inner surface of the top cover 12 so as to cover the breathing hole 20. The filter 51 is formed from a gas adsorbent that includes activated carbon, silica gel, or the like. The inner unit case 52 includes a side surface portion 52A, an upper surface portion 52B, and another upper surface portion 52C. The side surface portion 52A is shaped into a cylindrical column. The upper surface portion 52B extends radially inwardly from a proximal end portion of the side surface portion 52A. The upper surface portion 52C, on the other hand, extends radially inwardly from a distal end portion of the side surface portion 52A.

In addition, the outer unit case 53 includes a side surface portion 53A, an annular upper surface portion 53B, and a lower surface portion 53C. The side surface portion 53A is fitted and secured over an outer peripheral side of the side surface portion 52A of the inner unit case 52. The upper surface portion 53B extends radially inwardly from an upper end portion of the side surface portion 53A. The upper surface portion 53B is physically joined up against the upper surface portions 52B, 52C of the inner unit case 52. The lower surface portion 53C closes an opening end on a lower side of the side surface portion 53A. Having the upper surface portion 53B disposed on an outer edge side of the small-diameter hole 22 of the breathing hole 20, the outer unit case 53 is fixedly attached to the inner surface of the top cover 12 using an adhesive or the like. The lower surface portion 53C of the outer unit case 53 is formed from a member having breathability.

An annular water repellent material 54 is fixedly mounted on an outer surface of the top cover 12. The water repellent material 54 is disposed on an outer edge side of the large-diameter hole 21 of the breathing hole 20.

The HDD 1 having arrangements as described heretofore according to the embodiment of the present invention is adapted to use the magnetic head disposed on a leading end side of the head gimbal assembly 15 to write data to, and/or read data from, each of the plurality of magnetic recording disks 14 rotatably driven by the spindle motor built into the box body 10.

The HDD 1 according to the embodiment of the present invention has the fiber waterproof body 30 and the pore waterproof body 40 mounted in the breathing hole 20 in the box body 10. Accordingly, should water or other form of liquid enter in the breathing hole 20 in the HDD 1 in a direction of an arrow A of FIG. 2, the liquid can be reliably adsorbed by the fiber waterproof body 30 and the pore waterproof body 40.

Consequently, according to the embodiment of the present invention, the fiber waterproof body 30 and the pore waterproof body 40 eliminate the problem of entry of water or other form of liquid in the box body 10, thereby enhancing performance, reliability, and the like of the HDD 1.

Moreover, the built-in filter unit 50 is disposed in the box body 10 so as to close the breathing hole 20. The gas adsorbent including activated carbon, silica gel, or the like, built into the built-in filter unit 50 can effectively remove harmful gases entering the box body 10 via the breathing hole 20 in a direction of an arrow B of FIG. 2. Performance, reliability, and the like of the HDD I can therefore be even further enhanced.

FIGS. 5 through 8 are views showing another embodiment of the present invention. In the descriptions that follow, like reference numerals refer to like parts and duplicate descriptions will be omitted.

Figure 5:
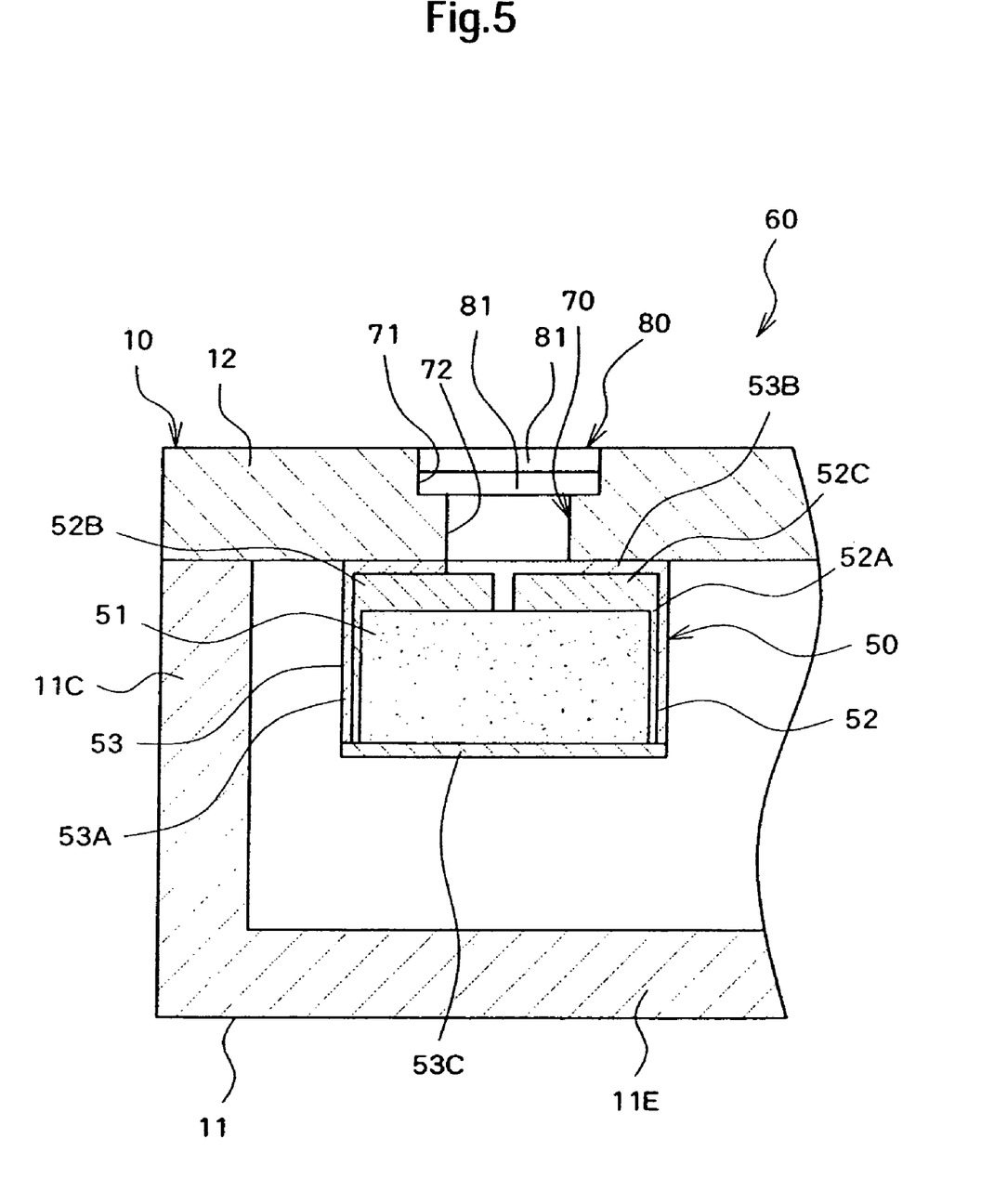
FIG. 5 is a fragmentary enlarged sectional view of the same elements as those shown in FIG. 2 according to another embodiment of the present invention.

Referring to FIG. 5, an HDD 60 according to another embodiment of the present invention includes a box body 10, a fiber waterproof body 80, and a built-in filter unit 50.

A top cover 12 of the box body 10 includes a breathing hole 70. The breathing hole 70 includes a circular stepped hole disposed on a side of a corner formed between a first side wall portion 11 A and a third side wall portion 11C of a box body main body 11. Referring to FIG. 5, the breathing hole 70 includes a large-diameter hole 71 and a small-diameter hole 72. The large-diameter hole 71 is an upper side portion of the breathing hole 70. The small-diameter hole 72 is disposed immediately below the large-diameter hole 71, forming a lower side portion of the breathing hole 70.

Figure 6:
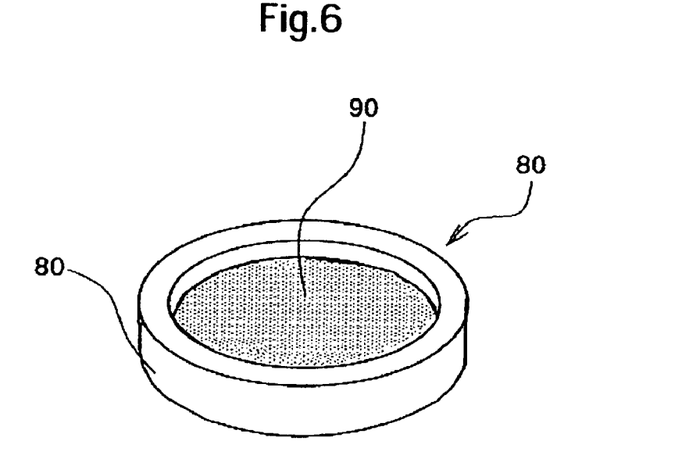
FIG. 6 is an enlarged perspective view showing a fiber waterproof body shown in FIG. 5.
Figure 7:
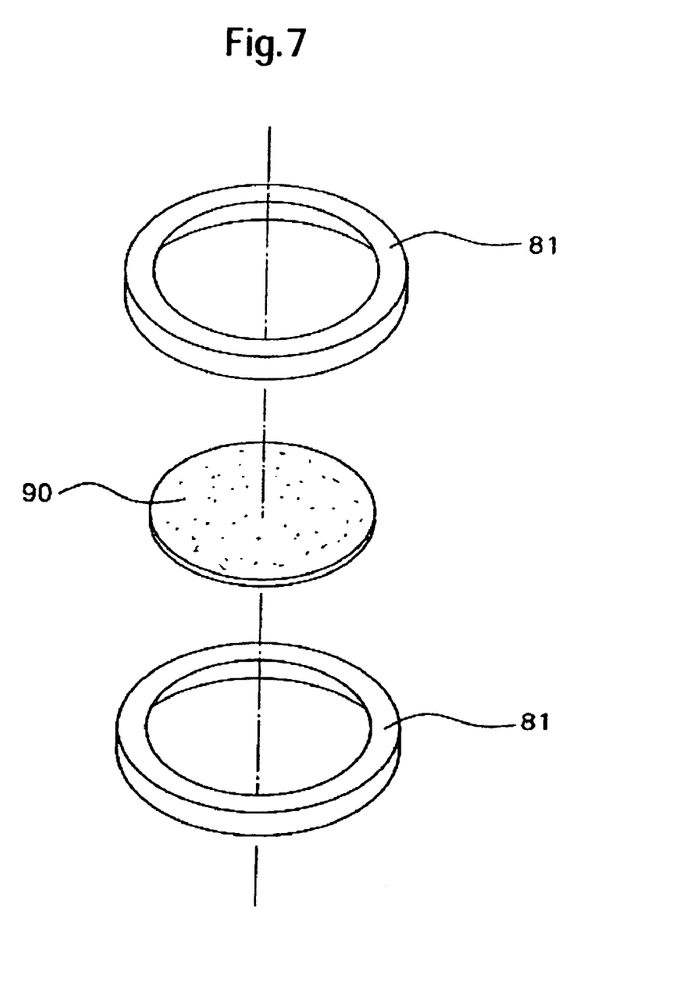
FIG. 7 is an exploded perspective view showing the fiber waterproof body shown in FIG. 6.
Figure 8:
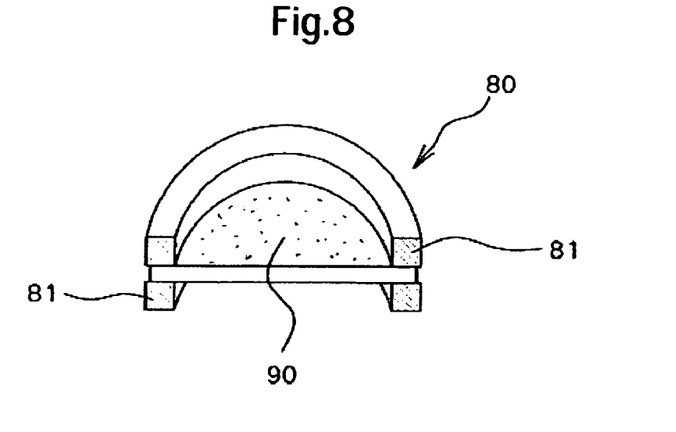
FIG. 8 is a longitudinal sectional view showing the fiber waterproof body shown in FIG. 6.

Referring to FIG. 6, the fiber waterproof body 80 includes a waterproof fiber material 90 clamped by an annular sheet 81 formed, for example, from a plastic or metallic sheet. The fiber waterproof body 80 is fitted and fixed in the large-diameter hole 71 of the breathing hole 70 using an adhesive or the like.

According to this embodiment of the present invention, the fiber waterproof body 80 and the waterproof fiber material 90 eliminate the problem of entry of water or other form of liquid in the box body 10. Electronic data typically recorded in the magnetic recording disks 14 can be prevented from being destroyed and performance, reliability, and the like of the HDD 60 can thereby be enhanced.

Figure 9:
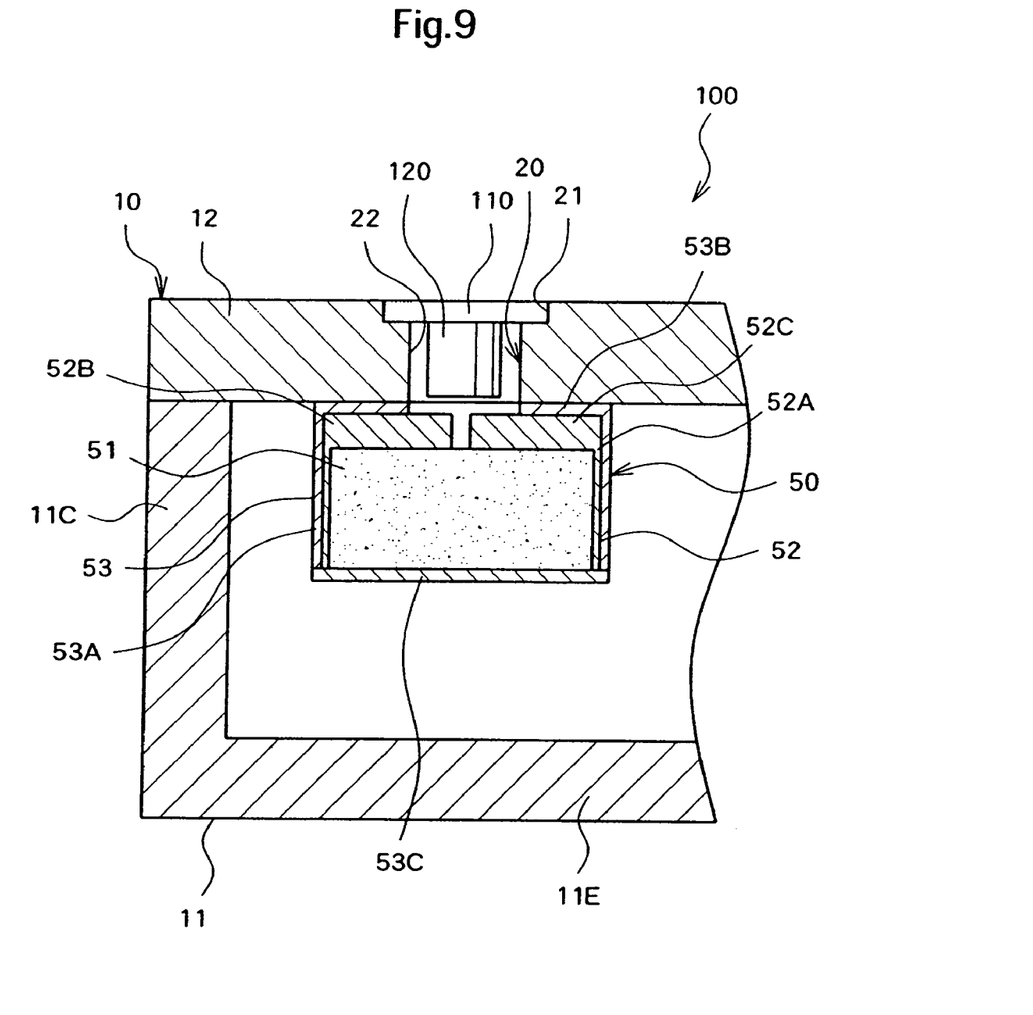
FIG. 9 is a fragmentary enlarged sectional view of the same elements as those shown in FIG. 2 according to still another embodiment of the present invention.
Figure 10:
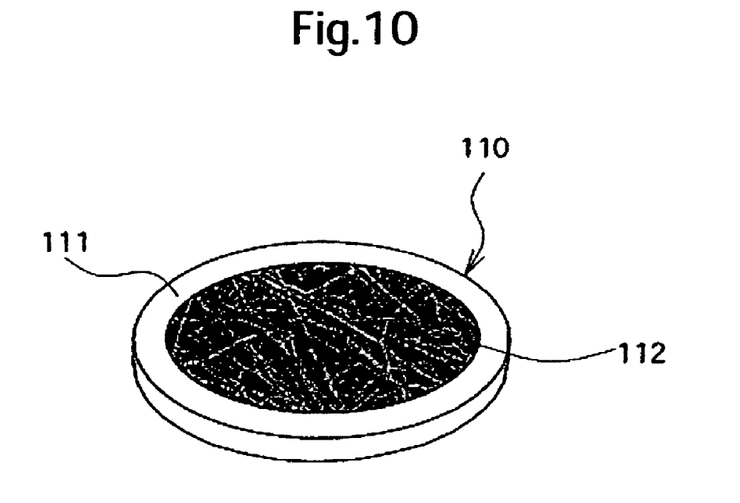
FIG. 10 is an enlarged perspective view showing a first fiber waterproof body shown in FIG. 9.
Figure 11:
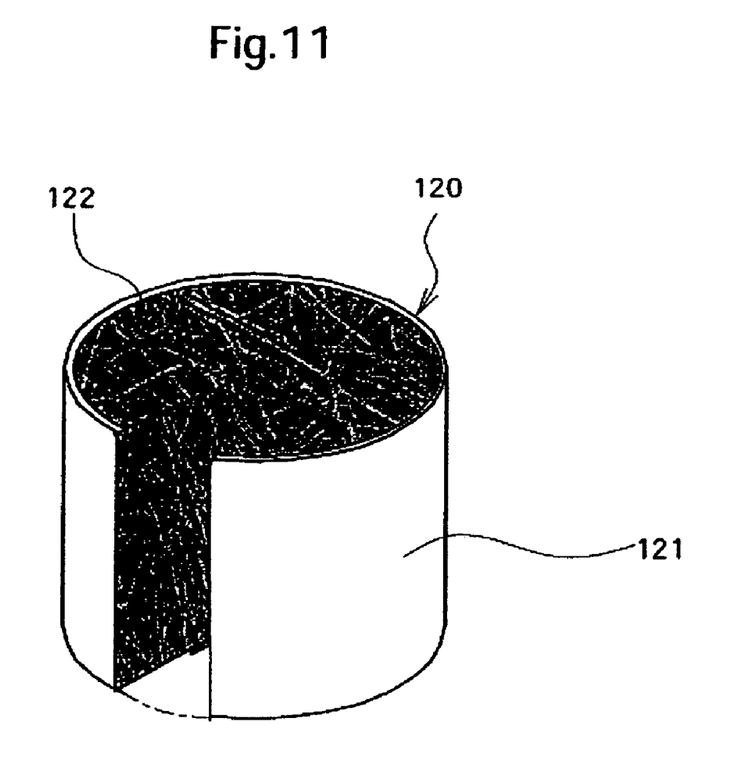
FIG. 11 is an enlarged perspective view showing a second fiber waterproof body shown in FIG. 9.

FIGS. 9 through 11 are views showing still another embodiment of the present invention. In the descriptions that follow, like reference numerals refer to like parts and duplicate descriptions will be omitted.

Referring to FIG. 9, an HDD 100 according to this embodiment of the present invention includes a box body 10, a first fiber waterproof body 110, a second fiber waterproof body 120, and a built-in filter unit 50.

Referring to FIG. 10, the first fiber waterproof body 110 includes a fiber mounting frame 111 and a waterproof fiber material 112 fitted and secured in the fiber mounting frame 111. The fiber mounting frame 111 is formed into an annular frame body from, for example, plastic. The fiber mounting frame 111 is fitted and fixed in a large-diameter hole 21 of the breathing hole 20 using an adhesive or the like.

The waterproof fiber material 112 is mixed with a water-absorbing polymer. When the waterproof fiber material 112 absorbs water, the water-absorbing polymer swells to fill gaps between fibers of the waterproof fiber material 112.

Referring to FIG. 11, the second fiber waterproof body 120 includes a fiber mounting case 121 and a waterproof fiber material 122 fitted and secured in the fiber mounting case 121. The fiber mounting case 121 is formed into a tubular body using, for example, plastic. The fiber mounting case 121 is disposed in a small-diameter hole 22 of the breathing hole 20 with a clearance allowed therebetween. The waterproof fiber material 122 of the second fiber waterproof body 120 is secured to a surface of the waterproof fiber material 112 of the first fiber waterproof body 110 using an adhesive or the like.

The waterproof fiber material 122 shares the same composition as the waterproof fiber material 112 and is mixed with a water-absorbing polymer. When the waterproof fiber material 122 absorbs water, the water-absorbing polymer swells to fill gaps between fibers of the waterproof fiber material 122.

According to the embodiment of the present invention having the arrangements as described above, when water or other form of liquid enters the breathing hole 20, the water-absorbing polymer mixed with the waterproof fiber materials 112, 122 of the first and the second fiber waterproof bodies 110, 120 swells to fill the gaps between the fibers of the waterproof fiber materials 112, 122. Accordingly, the waterproof fiber materials 112, 122 can even more reliably block off entry of the liquid in the box body 10 through the breathing hole 20. Performance, reliability, and the like of the HDD 100 can therefore be enhanced even further.

Figure 12:
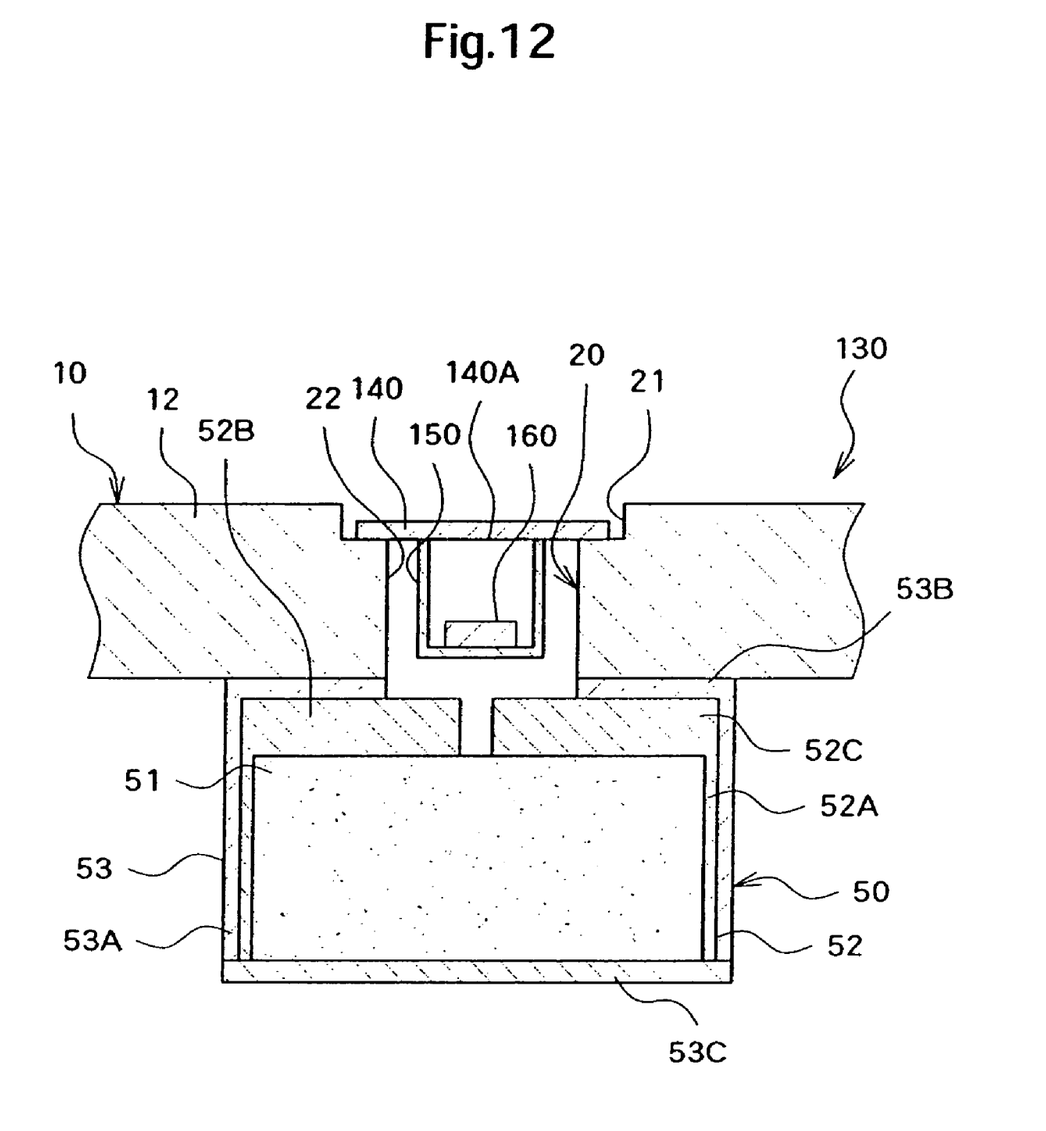
FIG. 12 is a fragmentary enlarged sectional view of the same elements as those shown in FIG. 2 according to a further embodiment of the present invention.
Figure 13:
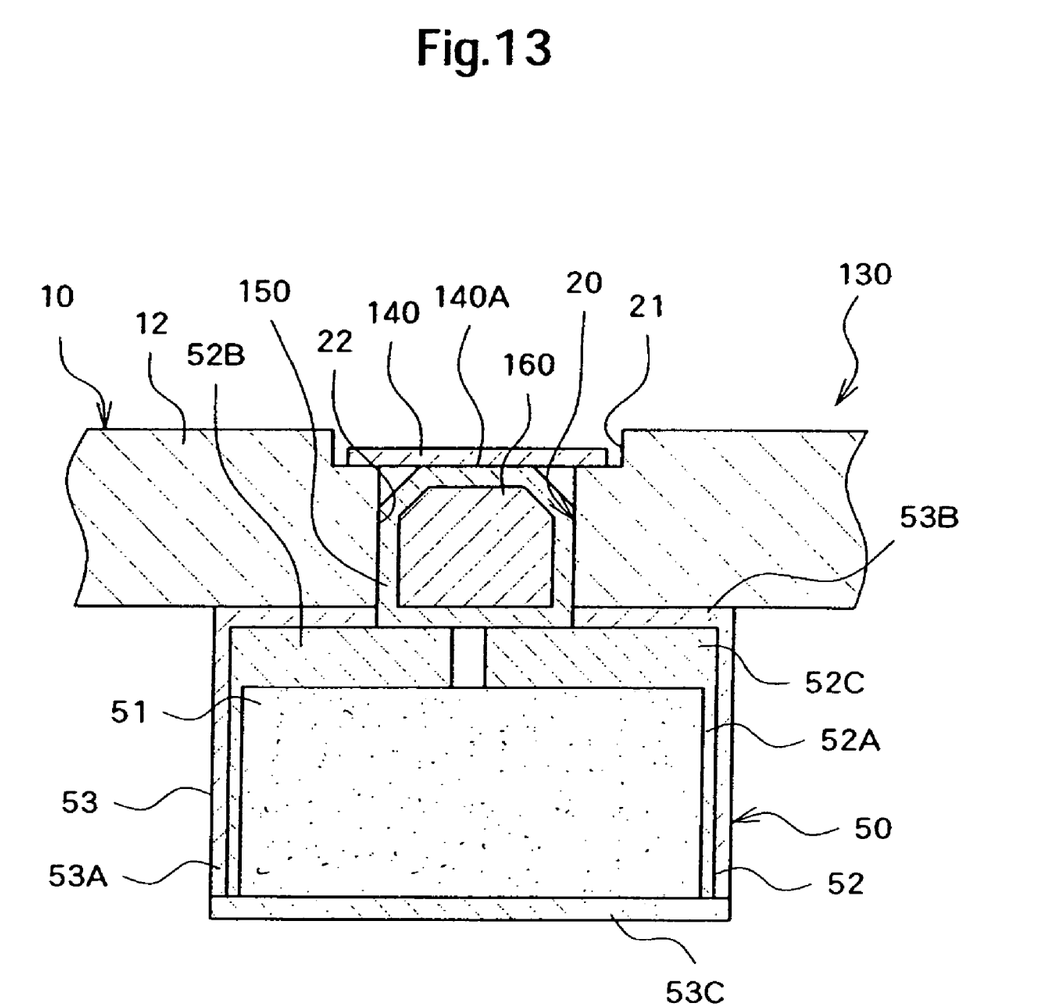
FIG. 13 is a fragmentary enlarged sectional view of the same elements as those shown in FIG. 12 in a condition, in which a water-absorbing polymer swells.

FIGS. 12 and 13 are views showing a further embodiment of the present invention. In the descriptions that follow, like reference numerals refer to like parts and duplicate descriptions will be omitted.

Referring to FIG. 12, an HDD 130 according to this embodiment of the present invention includes a box body 10, a breathable member 140, a flexible container 150, and a water-absorbing polymer 160.

The breathable member 140 is formed into a disk from a hard resin material or the like. The breathable member 140 has a large number of vent holes (not shown) drilled in a surface thereof through a width direction. In addition, the breathable member 140 includes a water supply port 140A drilled at a center thereof. Further, the breathable member 140 is removably mounted to a bottom surface of a large-diameter hole 21 forming part of a breathing hole 20 using a screw (not shown) or the like.

The flexible container 150 is formed into a bottomed cylinder using, for example, a resin material or the like having elasticity. The flexible container 150 has an opening end side fixedly mounted to the breathable member 140.

The water-absorbing polymer 160 is accommodated in the flexible container 150. When water or other form of liquid enters the flexible container 150 through the water supply port 140A in the breathable member 140, the water-absorbing polymer 160 absorbs the liquid to swell as shown in FIG. 13.

According to this embodiment of the present invention having the arrangements as described above, when water or other form of liquid enters the breathing hole 20, the liquid enters the flexible container 150 by way of the water supply port 140A in the breathable member 140. The water-absorbing polymer 160 then absorbs the liquid. As a result, the water-absorbing polymer 160 swells with the flexible container 150 as shown in FIG. 13. The flexible container 150 and the water-absorbing polymer 160 then serve as a sealing plug that seals the breathing hole 20, thereby reliably blocking entry of the liquid through the breathing hole 20.

Figure 14:
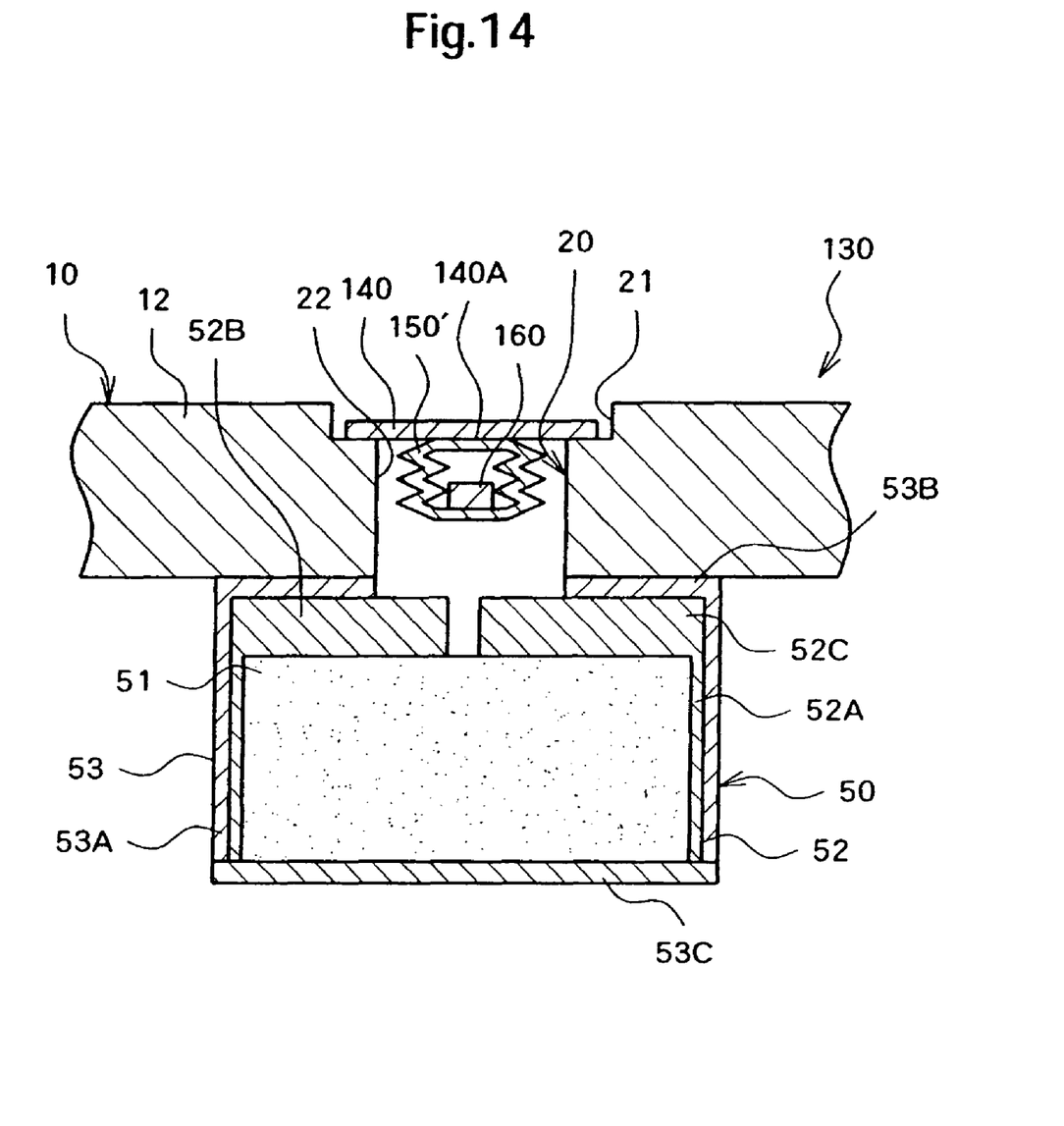
FIG. 14 is a fragmentary enlarged sectional view showing a modified example of an embodiment of the present invention.
Figure 15:
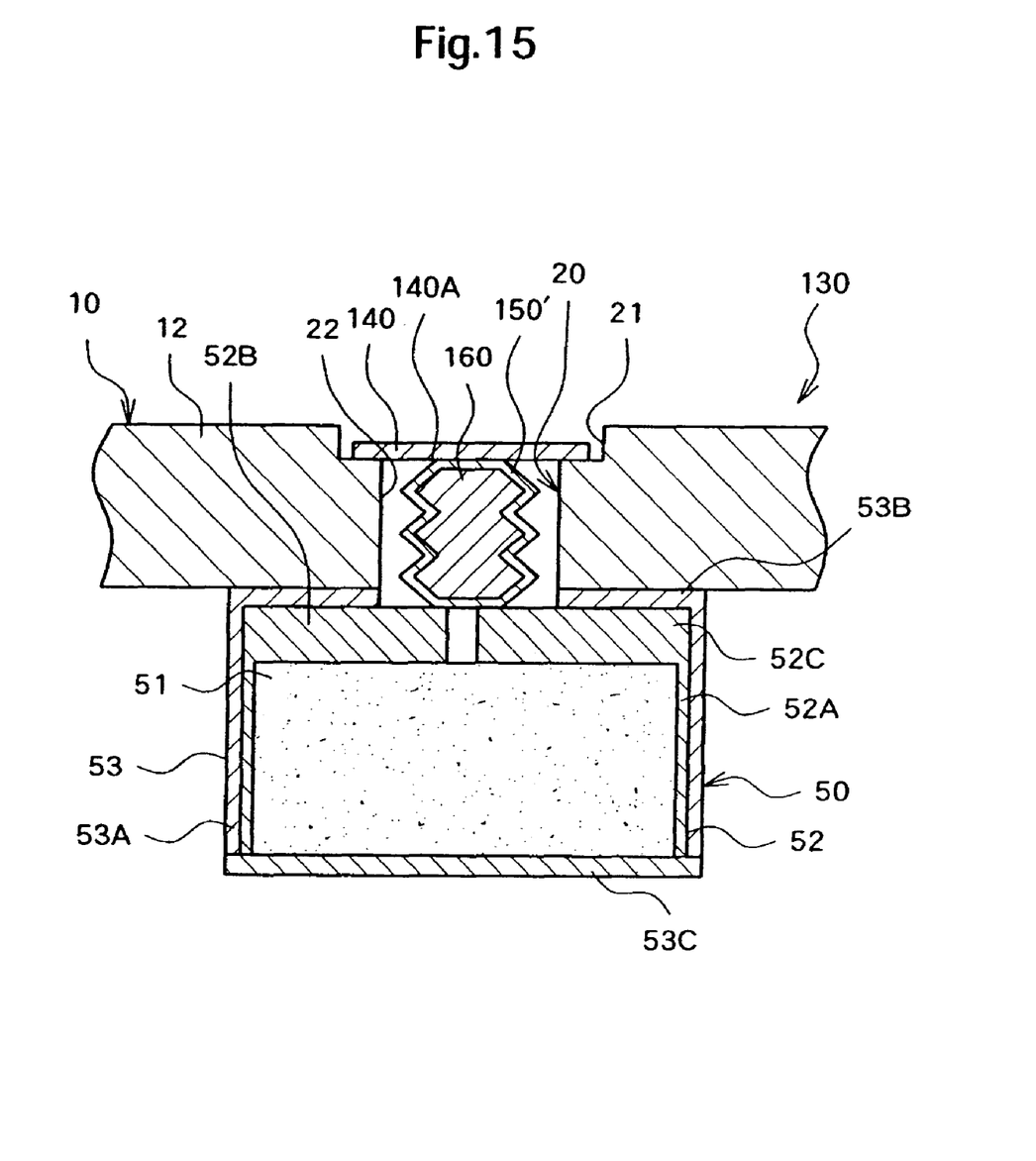
FIG. 15 is a fragmentary enlarged sectional view showing a condition, in which a water-absorbing polymer swells.

In this embodiment of the present invention described above, the flexible container 150 is a cylindrical body extending straight in an axial direction thereof. The present invention is not limited to this arrangement; rather, as shown, for example, in a modified example shown in FIG. 14, a flexible container 150' may be formed into a bellows shape. Even with this arrangement, when water or other form of liquid enters the breathing hole 20, the liquid enters the flexible container 150' by way of the water supply port 140A in the breathable member 140. The water-absorbing polymer 160 then absorbs the liquid. As a result, the water-absorbing polymer 160 swells as shown in FIG. 15. This stretches the flexible container 150' axially. The flexible container 150' and the water-absorbing polymer 160 then function as a sealing plug that seals the breathing hole 20, thereby reliably blocking entry of the liquid through the breathing hole 20.

The preferred embodiments of the present invention have been described with reference to the arrangement, in which the pore waterproof body 40 as a waterproof body is fitted in the small-diameter hole 22 of the breathing hole 20. The present invention is not, however, limited to this arrangement and, for example, the fiber waterproof body 120 may be fitted in the small-diameter hole 22 of the breathing hole 20.

What is claimed is:

1. A magnetic disk drive, comprising:
a box body having a head disk assembly built therein for writing data to, and reading data from, a magnetic recording medium,
wherein the box body includes a wall surface having a circular stepped breathing hole drilled therein to penetrate therethrough, the circular stepped breathing hole comprising two portions, the two portions comprising an upper side portion and a lower side portion,
wherein the circular stepped breathing hole includes a large-diameter hole and a small-diameter hole disposed below the large-diameter hole, the large-diameter hole forming the upper side portion and the small-diameter hole forming the lower side portion of the breathing hole; and wherein the breathing hole includes a pore waterproof body having therein a plurality of pores disposed in the small-diameter hole and prevents entry of a liquid in the box body by using surface tension of the liquid when the liquid enters the pores and a fiber waterproof body comprising a waterproof fiber layer disposed in the large-diameter hole above the pore waterproof body.

2. A magnetic disk drive, comprising:

a box body having a head disk assembly built therein for writing data to, and reading data from, a magnetic recording medium, wherein the box body includes a wall surface having a circular stepped breathing hole drilled therein to penetrate therethrough, the circular stepped breathing hole comprising two portions, the two portions comprising an upper side portion and a lower side portion, wherein the circular stepped breathing hole includes a large-diameter hole and a small-diameter hole disposed below the large-diameter hole, the large-diameter hole forming the upper side portion and the small-diameter hole forming the lower side portion of the breathing hole; and wherein the breathing hole includes a waterproof fiber material disposed in the large-diameter hole that blocks circulation of a liquid, while allowing circulation of a gas, wherein said breathing hole further comprises a pore waterproof body having therein a plurality of pores, the pore waterproof body is disposed in the small-diameter hole and below the waterproof fiber material.

3. A magnetic disk drive, comprising:

a box body having a head disk assembly built therein for writing data to, and reading data from, a magnetic recording medium, wherein the box body includes a wall surface having a circular stepped breathing hole drilled therein to penetrate therethrough, the circular stepped breathing hole comprising two portions, the two portions comprising an upper side portion and a lower side portion, wherein the circular stepped breathing hole includes a large-diameter hole and a small-diameter hole disposed below the large-diameter hole, the large-diameter hole forming the upper side portion and the small-diameter hole forming the lower side portion of the breathing hole; and wherein the breathing hole includes a fiber material disposed in the large-diameter hole, the fiber material is mixed with a water-absorbing polymer that swells to fill gaps between fibers when water enters the breathing hole, said breathing hole further comprises a pore waterproof body having therein a plurality of pores, the pore waterproof body is disposed in the small-diameter hole and below the fiber material.

4. A magnetic disk drive, comprising:

a box body having a head disk assembly built therein for writing data to, and reading data from, a magnetic recording medium, wherein the box body includes a wall surface having a circular stepped breathing hole drilled therein to penetrate therethrough, the circular stepped breathing hole comprising two portions, the two portions comprising an upper side portion and a lower side portion, wherein the circular stepped breathing hole includes a large-diameter hole and a small-diameter hole disposed below the large-diameter hole, the large-diameter hole forming the upper side portion and the small-diameter hole forming the lower side portion of the breathing hole;

wherein the breathing hole includes a breathable member and a flexible container disposed therein, the flexible container having a water intake and accommodating therein a water-absorbing polymer that absorbs a liquid to swell when the liquid enters the flexible container through the water intake; and wherein the breathable member is mounted to a bottom surface of the large-diameter hole and the flexible container is mounted in the small-diameter hole below the breathable member, wherein said breathable member further comprises a plurality of vent holes.

* * * * *